Dec. 11, 1962 M. M. REDDI 3,067,771
PNEUMATIC FLUID CONTROL VALVE
Filed May 19, 1958 2 Sheets-Sheet 1

Inventor
Mullapudi M. Reddi

Dec. 11, 1962 M. M. REDDI 3,067,771
PNEUMATIC FLUID CONTROL VALVE
Filed May 19, 1958 2 Sheets-Sheet 2

Inventor
Mullapudi M. Reddi
Hill Sherman Meroni Gross & Simpson
Attys by

United States Patent Office 3,067,771
Patented Dec. 11, 1962

3,067,771
PNEUMATIC FLUID CONTROL VALVE
Mullapudi M. Reddi, Philadelphia, Pa., assignor to The Dole Valve Company, Morton Grove, Ill., a corporation of Illinois
Filed May 19, 1958, Ser. No. 736,040
1 Claim. (Cl. 137—494)

This invention relates to fluid control valves and more particularly relates to an improved means for controlling the operation of a pilot operated diaphragm valve.

As is well known in the art, pilot operated diaphragm valves are utilized for controlling the flow of fluid through a port and are actuated by fluid pressure differential across the diaphragm. Valve bodies constructed to accommodate these valves are generally constructed with an annular fluid inlet which opens to one side of the valve body and which has an annular fluid outlet port formed concentrically therewith and interiorly thereof which defines a valve seat. The diaphragm valve is mounted on the open end of the valve body and is cooperable with the valve seat to control the flow of fluid from the fluid inlet to the fluid outlet port in the following manner: The diaphragm valve has a bleed hole or bleed holes formed in the periphery of the valve member which communicate fluid in the annular fluid inlet to a chamber lying above the lateral surface of the diaphragm valve. A central fluid passageway is formed within the diaphragm valve member and communicates the chamber above the lateral surface of the diaphragm valve member with the fluid outlet port so that when the central fluid passageway is open, fluid will flow from the upper chamber through the fluid passageway to the outlet port. Since the bleed hole or holes have a combined flow passage area which is considerably smaller than that of the central passageway, fluid will flow through the central passageway to the outlet port from the upper chamber faster than fluid will flow from the annular inlet passage to the upper chamber so that a differential fluid pressure is created across the diaphragm causing the pressure of the fluid in the annular inlet passage to unseat the diaphragm valve to thereby directly intercommunicate the annular fluid inlet with the central fluid outlet port.

A pilot is generally provided in the valve body and is arranged to be cooperable with the central fluid flow passageway within the diaphragm valve member to control fluid flow therethrough and is normally biased into engagement with the diaphragm valve member by a spring or the like to close communication between the upper chamber and the fluid outlet port to permit fluid pressure to build up in the region above the diaphragm which exceeds that below so that the diaphragm valve member will move into engagemnet with the annular seat defining the outlet port to close communication between the annular fluid inlet and the fluid outlet port.

It has heretofore been the practice to provide a solenoid for effecting retractable movement of the pilot but since solenoid control units are relatively expensive and, due to their complexity, prone to mechanical failure, it is obviously desirable to provide an alternate, less expensive, means for actuating the pilot valve which is of relatively simple design.

Accordingly, applicant has devised a simple, inexpensive, readily assembled pneumatic control means for completely controlling the actuation of the pilot which has the advantageous characteristics of simplicity and inexpensiveness.

Applicant has provided a device wherein the pilot is normally biased into engagement with the diaphragm valve and wherein the pilot is connected to an air diaphragm which may be retractably moved with respect to the diaphragm valve to permit the opening thereof to allow fluid flow therepast.

It is, therefore, a principal object of this invention to provide a pneumatic control means for a fluid operated diaphragm shut off valve.

It is another object of this invention to provide a mechanism for controlling the actuation of a diaphragm shut off valve of the type above described wherein a second diaphragm is connected to the controlling pilot and wherein pneumatic means are utilized for effecting movement of the second diaphragm and the pilot to which it is connected.

These and other objects of the invention will appear from time to time as the following specification proceeds and with reference to the accompanying drawings, wherein.

Figure 1:
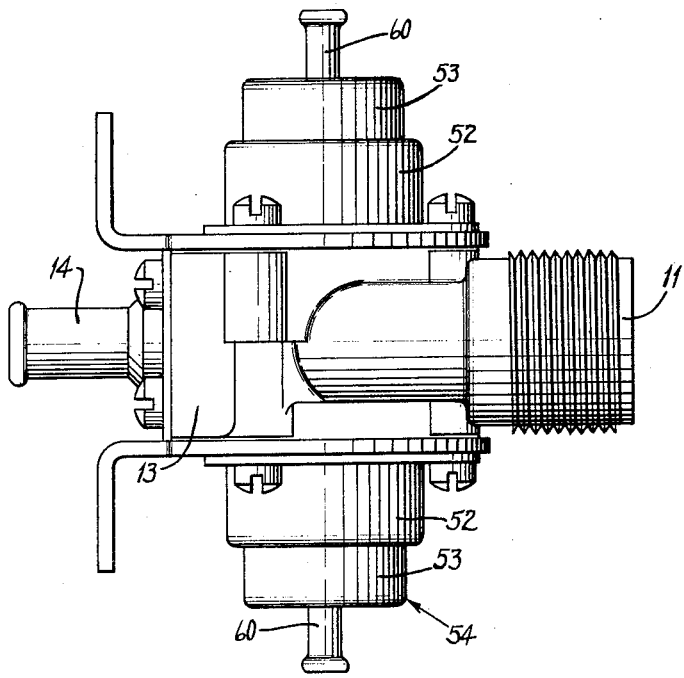
FIGURE 1 is a side elevational view of a valve constructed in accordance with the principles of the present invention.
Figure 2:
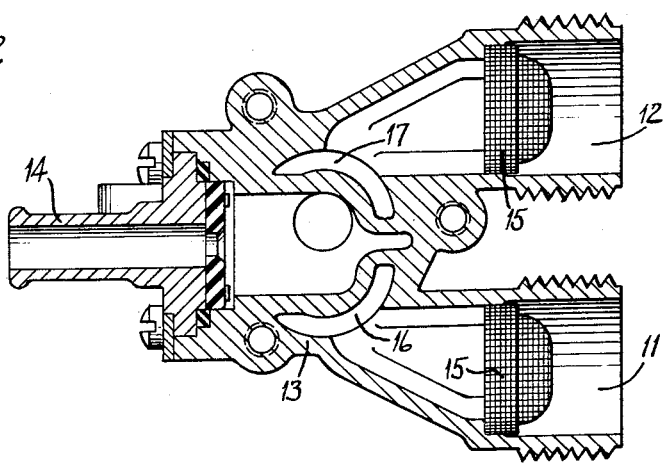
FIGURE 2 is a horizontal sectional view through the valve structure illustrated in FIGURE 1.
Figures 3, 4:
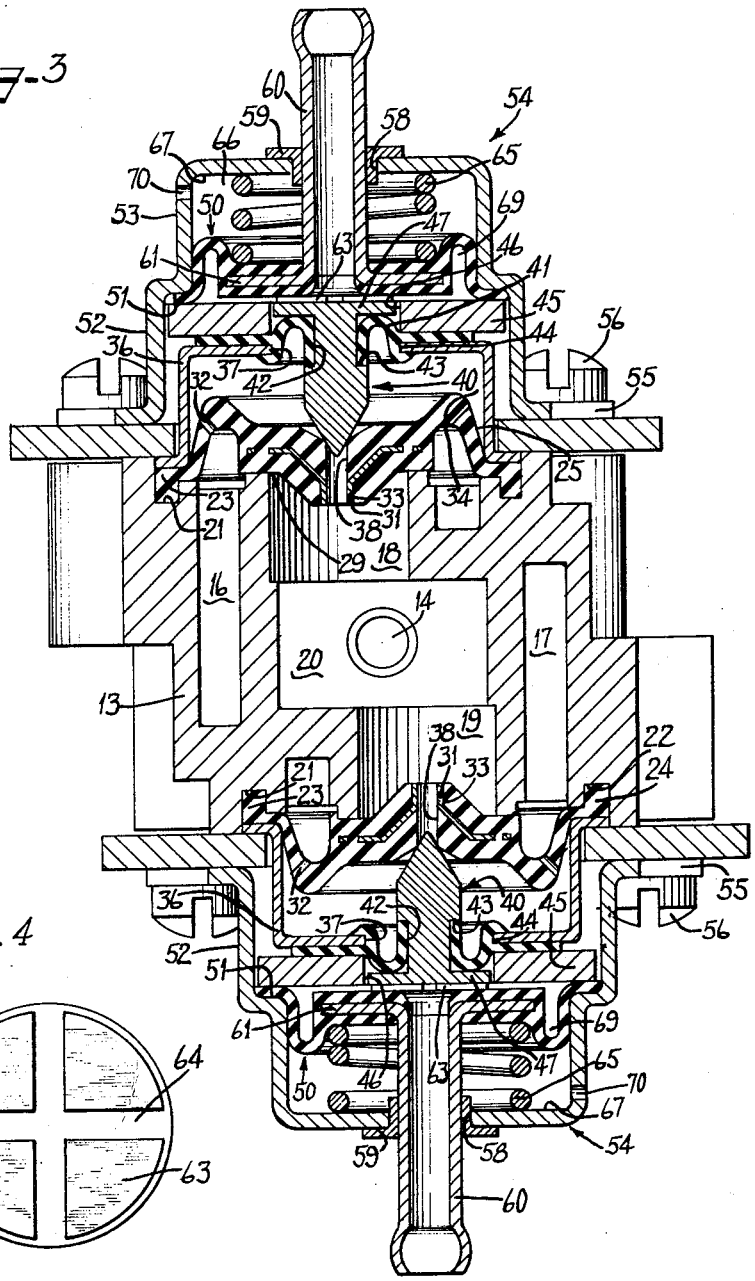
FIGURE 3 is a vertical sectional view through the valve structure illustrated in FIGURE 1 and showing the pneumatic control mechanism for controlling the actuation of a diaphragm shut off valve which has been constructed in accordance with the principles of the present invention.
FIGURE 4 is a plan view of a spider used with the valve of FIGURE 3.

In the embodiment of the invention illustrated in the drawings, there is shown a mixing valve 10 having hot and cold fluid inlets 11 and 12, respectively, leading into the valve body 13 thereof and having an outlet 14 leading therefrom.

The inlets 11 and 12 are each shown as having filter screens 15 therein for filtering out foreign particles which may be present in the fluid flowing to the valve and as leading to annular fluid passageways 16 and 17 which open to opposite sides of the valve body 13.

A pair of fluid ports 18 and 19 open to opposite sides of the valve body 13 and are formed concentrically with and interiorly of the annular fluid passages 16 and 17, respectively, and open to a mixing chamber 20 which, in turn, is communicable with the outlet 14 from the valve body.

Annular grooves 21 and 22 are provided at each open end of the valve body to receive annular depending lips 23 and 24 of a pair of identical pilot operated annular diaphragm valves 25 and 26. Since the diaphragm valve actuating means are identical for each of the diaphragm valves 25 and 26, it will suffice to give a complete description of the hot fluid diaphragm control valve 25.

The diaphragm valve 25 is preferably formed from rubber, an elastomer, or other like resilient material and has a thickened central portion 28, an inner face 29 which is engageable with an annular seat 30 extending around the port 18 to block the flow of fluid from the annular passage 16 to the outlet 14. The thickened central portion 28 of the diaphragm valve 25 is further shown as having a flanged metal insert 31 molded therein for reenforcing the same. The metallic insert 31 within the thickened portion 28 of the diaphragm valve 25 is further shown as having a tubular portion 36 projecting from the face 29 of the valve which forms a passageway member concentric with a central passageway 38 leading through the diaphragm valve.

The diaphragm valve 25 is also provided with a bleeder passageway 32 through the relatively thin walls of the diaphragm valve 25 outwardly of the thickened portion 28 thereof which leads from the annular passage 16 to a diaphragm chamber 34 formed between the upper lateral surface of the diaphragm valve 25 and the inner annular surface of an end closure cap 36 which has a centrally located aperture 37 therein. It is, of course, obvious to those skilled in the art that more than one bleeder passageway may be provided within the diaphragm valve 25 and that the number and size of bleeder passageways governs the speed of valve closing movement and reduces the chances of valve failure due to the presence of foreign materials in the bleed passageways. The total area of the bleeder hole or holes must, however, be less than the area of the central passageway 38.

A pilot 40 is movably positioned within the aperture 37 and is maintained in fluid tight relation with the walls thereof by means of a resilient pilot seal 41 which fits about a circumferentially reduced portion 42 of the pilot 40 and is seated upon an annular seat 43 formed in the side wall of the pilot 40. An annular cap receiving groove 44 is formed about the lower lateral surface of the pilot seal 41 and is arranged to engage the wall portion of the end closure cap 36 defining the aperture 37.

A lateral disk 45 having a central aperture 46 therein seats on the laterally extending annular peripheral portion of the pilot seal 41 and is so formed that the central aperture 46 serves as a guide for an annular disk 47 which is formed integrally with the pilot member 40.

A flexible annular diaphragm 50 is peripherally seated on the lateral disk 45 and is abutted on the upper surface thereof by an annular shoulder 51 formed intermediate a circumferentially enlarged and circumferentially reduced portion 52 and 53, respectively, of a housing 54. The housing 54 has a peripheral flange 55 therearound through which are arranged to extend a plurality of screws 56 which extend into the valve body 13 to maintain the pilot seal 41, disk 45, and diaphragm 50 properly positioned therewithin.

The housing 54 is centrally apertured as indicated at 58 to receive a guide bushing 59 therein through which is arranged to be slidably positioned an air conduit 60. The air conduit 60 has a laterally flanged portion 61 which is molded within diaphragm 50 so as to be movable therewith. A spider 63 having a plurality of channels 64 formed therein is bonded or otherwise suitably secured to the diaphragm member 50 and is further suitably secured to the annular disk 47 of pilot member 40 to interconnect the pilot member 40 with the diaphragm 50.

It will further be understood that a spring member 65 is provided within the spring chamber 66 formed between the upper surface of the diaphragm 50 and the lower surface of the housing 54 which abuts the annular end surface 67 of the housing 54 at one end thereof and, at the other end thereof, the upper annular surface of the diaphragm 50 so that the pilot member 40 is normally biased into engagement with the wall portion of the diaphragm valve 25 defining the central fluid passageway 38.

It will further be noted that an air chamber 69 is formed intermediate the upper annular surface of the disk 45 and the lower surface of the diaphragm 50 so that when the air conduit 60 is communicated with a source of pressurized air, air will flow through the conduit, thence through the channels 64 in the spider 63 and into the air chamber 69 so that upon the buildup of a certain predetermined pneumatic pressure within the air chamber 69 the diaphragm 50 will be moved upwardly against the biasing force of spring member 65 to thus unseat the pilot member 40 from the diaphragm valve 25 to flush the fluid chamber above diaphragm 25 to permit the opening of the diaphragm 25 by fluid pressure as has been hereinbefore explained more fully in detail.

It will herein be noted that a vent passage 70 has been provided through the housing 54 above the diaphragm 50 to act as an atmospheric bleed and that the bushing 59 within the aperture 58 has been provided merely to facilitate assemblage of the valve structure.

Applicant has thus provided a novel means for effecting operation of the pilot member 40 wherein the pilot is normally biased into engagement with the diaphragm 25 and wherein pneumatic means are utilized to effect movement of the pilot 40 away from the diaphragm 25 to permit the fluid actuation thereof and that the pneumatic control means is of relatively simple design and may be economically manufactured.

It will herein be understood that this embodiment of the invention has been used for illustrative purposes only and that various modifications and variations in the present invention may be effected without departing from the spirit and scope of the novel concepts thereof.

I claim as my invention:

A valve control unit comprising a housing having a diaphragm disposed therein and extending across the interior thereof, first and second chambers formed within said housing on opposite sides of said diaphragm, a valve port formed within said housing, a pilot connected to said diaphragm and movable therewith relative to said port to open and close said port, and a fluid conduit connected to said diaphragm and movable therewith slidably guided within said housing and opening to one of said chambers for communicating pressurized fluid thereto to effect movement of said diaphragm and said connected pilot in one direction, said fluid conduit extending through an outside wall of said housing and guided for movement thereby providing an attachment nipple on the outside of said housing.

References Cited in the file of this patent

UNITED STATES PATENTS

| | | |
|---|---|---|
| 383,426 | Mason | May 22, 1888 |
| 449,222 | Kimball | Mar. 31, 1891 |
| 687,273 | Schoeffel | Nov. 26, 1901 |
| 1,535,562 | Atkins | Apr. 28, 1925 |
| 2,405,466 | Tabb | Aug. 6, 1946 |
| 2,482,291 | Rush | Sept. 20, 1949 |
| 2,610,819 | Sutton | Sept. 15, 1952 |
| 2,623,542 | Obermaier | Dec. 30, 1952 |
| 2,712,324 | Lund | July 5, 1955 |
| 2,732,858 | Noon | Jan. 31, 1956 |
| 2,861,587 | Hursen | Nov. 25, 1958 |